United States Patent [19]

Yamamoto et al.

[11] 4,122,007

[45] Oct. 24, 1978

[54] RECLAIMING PROCESS FOR ZEOLITE SERVED FOR ADSORBING AMMONIACAL NITROGEN CONTAINED IN SEWAGE

[75] Inventors: Tamechika Yamamoto, Zushi; Yoichi Nishimura, Komae; Seiji Sanga, Toyonaka, all of Japan

[73] Assignee: Catalysts & Chemicals Industries Co., Ltd., Tokyo, Japan

[21] Appl. No.: 677,159

[22] Filed: Apr. 15, 1976

[30] Foreign Application Priority Data

Apr. 30, 1975 [JP] Japan .................................. 50-51475

[51] Int. Cl.² .............................................. B01J 1/09
[52] U.S. Cl. .................................. 210/32; 210/38 R
[58] Field of Search ............... 423/157, 181, 182, 183; 210/38 R, 30 R, 32; 252/412

[56] References Cited

U.S. PATENT DOCUMENTS

| | | | |
|---|---|---|---|
| 2,582,098 | 1/1952 | Braithwaite et al. | 210/32 |
| 2,660,558 | 11/1953 | Juda | 210/32 |
| 2,687,999 | 8/1954 | Bott et al. | 210/32 |
| 3,147,214 | 9/1964 | Kressman et al. | 210/30 R |
| 3,475,330 | 10/1969 | Giles | 210/38 |
| 3,691,109 | 4/1972 | Carsen | 210/32 |
| 3,723,308 | 3/1973 | Breck | 210/38 R |
| 3,869,383 | 3/1975 | Shimamura | 210/32 |
| 3,977,968 | 8/1976 | Odland | 210/32 |

*Primary Examiner*—Charles N. Hart
*Assistant Examiner*—E. Rollins Cross
*Attorney, Agent, or Firm*—Blanchard, Flynn, Thiel, Boutell & Tanis

[57] ABSTRACT

Disclosed in the present invention is a process for removing ammoniacal nitrogen from zeolite by bringing a zeolite-containing substance employed for adsorbing ammoniacal nitrogen contained in sewage into contact with an aqueous solution of sodium carbonate having a pH value of 11±1.0.

2 Claims, No Drawings

RECLAIMING PROCESS FOR ZEOLITE SERVED FOR ADSORBING AMMONIACAL NITROGEN CONTAINED IN SEWAGE

BACKGROUND OF THE INVENTION

The present invention relates to a reclaiming process for zeolite-containing substances used for treating sewage containing ammoniacal nitrogen.

It is a well-known fact that natural zeolite, synthetic zeolite or aluminosilicate akin to zeolite (these substances are hereinafter called zeolite-containing substance collectively) are very effective in removing ammoniacal nitrogen contained in sewage. However, their adsorption capacity is not great so that, when it is intended to reuse a zeolite-containing substance once used in removing ammoniacal nitrogen by adsorption, it is necessary to conduct a reclamation treatment to separate ammoniacal nitrogen.

The present inventors have previously proposed a process for reclaiming zeolite-containing substances by heating in an invention entitled "Process for Treating Active Sludge by utilizing Zeolite" (cf. Japanese Patent Application No. 12353/1947 and Japanese Laid-Open Application No. 82661/1948), but proposed in the present invention is a process for reclaiming zeolite-containing substances by means of chemicals.

The foregoing zeolite-containing substance is crystalline aluminosilicate having the formula $Me_{2/n}O \cdot Al_2O_3 \cdot xSiO_2 \cdot yH_2O$ wherein Me represents alkali or alkaline earth metal, $n$ represents the valence thereof, and $x$ and $y$ respectively represent coefficients. In the above general formula, the cation Me is normally Na. However, as it has exchangeability, ion-exchange thereof for calcium cation, ammonium cation, etc. is possible, and because of this characteristic, zeolite-containing substances can be utilized as the hard-water softening agent or the ammonia-containing sewage treating agent.

The ammonium cation retained by zeolite-containing substances as a result of ion-exchange can be re-exchanged for another cation, and through this re-exchange, the ammonium cation adsorbability of zeolite-containing substances can be restored. In this case, however, it is required to select an appropriate reclaiming liquid; otherwise, there will take place such troubles as the generation of scales within the reclaiming apparatus and/or the degeneration of ammonium cation adsorbability of zeolite-containing substances after reclamation. Heretofore, as the reclaiming liquid, an aqueous solution of CaO, an aqueous solution of $Ca(OH)_2$ or solutions prepared by adding NaCl to these aqueous solutions have been popular. However, these conventional reclaiming liquids are undesirable in view of the fact that there is a fear of generation of scales at the time of reclamation of zeolite and besides there is a fear of generation of scales also at the time of stripping ammonia concentrated in the reclaiming liquid in order to reclaim the reclaiming liquid per se.

SUMMARY OF THE INVENTION

The present inventors have found the fact that it is possible to reclaim zeolite-containing substances once used for adsorption of ammoniacal nitrogen efficiently by the use of $Na_2CO_3$ in lieu of the conventional CaO or $Ca(OH)_2$ and by maintaining the pH value of the reclaiming liquid within a specific range. In other words, application of an aqueous solution containing sodium carbonate and having a pH value in the range of $11 \pm 1.0$ as the reclaiming liquid renders it possible to reclaim zeolite-containing substances without impairing the ammoniacal nitrogen adsorbability thereof and accordingly the thus reclaimed zeolite-containing substances can display adsorbability equal to or superior to the ammoniacal nitrogen adsorbability possessed by new zeolite-containing substances. Moreover, the reclaiming liquid according to the present invention is free of generation of scales even at the time of expelling ammonia contained in the reclaiming liquid by applying air stripping thereto, as well as when reclaiming zeolite-containing substances.

In the present invention, although it is important to employ an aqueous solution containing sodium carbonate as the reclaiming liquid, it is also important to maintain the pH value of said aqueous solution within the aforesaid range. In the case where the pH value of the reclaiming liquid is, for instance, in excess of 12, there is a danger of destruction of the zeolite-containing substance, while in the case where the pH value of the reclaiming liquid is below 10, the ammoniacal nitrogen adsorbability of a zeolite-containing substance after reclamation is not restored to be as good as a new zeolite-containing substance, or it rather shows a tendency to degenerate with every reclamation. In this connection, when the reclaiming liquid under the present invention is saturated with ammonia, its reclaiming ability can be restored by air stripping. On the occasion of this air stripping, in view of the fact that the addition of NaOH to the reclaiming liquid in advance has the effect of said NaOH absorbing carbonic acid gas at the time of aeration and turning into $Na_2CO_3$, it is desirable to add NaOH to the reclaiming liquid as occasion demands. Nevertheless, it goes without saying that the pH value of the reclaiming liquid should be maintained within the range of $11 \pm 1.0$ even in that case.

DESCRIPTION OF THE PREFERRED EMBODIMENTS

Example 1

After adding natural zeolite (i.e., a product from Shiraishi in Miyagi Prefecture, Japan) to a secondary discharge water of city drainage (concentration of ammoniacal nitrogen: 20–30 ppm) at the ratio of 4000 mg/l and separating ammoniacal nitrogen contained in said discharge water through adsorption by stirring the mixture, filtration was conducted. Next, the zeolite cake obtained through said filtration was reclaimed with $0.25N-Na_2CO_3$ solution. Subsequently, by repeating the operation of removing ammoniacal nitrogen contained in a new secondary discharge water through adsorption by the use of the thus reclaimed zeolite again, the relationship between the pH value of reclaiming liquid and the rate of removal of ammoniacal nitrogen by the reclaimed zeolite was examined. The result was as shown in the following table. In this context, the rate of removal of ammoniacal nitrogen was figured out by measuring the concentration of ammoniacal nitrogen left in the filtrate after the filtration of said secondary discharge water from zeolite.

| frequency of reclamation | pH value of reclaiming liquid | rate of removal of ammoniacal nitrogen (%) |
| --- | --- | --- |
| 1 | 10.25 | 79.7 |
| 2 | 10.09 | 70.3 |
| 3 | 9.90 | 65.3 |
| 4 | 9.74 | 62.5 |

-continued

| frequency of reclamation | pH value of reclaiming liquid | rate of removal of ammoniacal nitrogen (%) |
|---|---|---|
| 5 | 9.44 | 58.9 |
| 6 | 9.20 | 48.0 |
| 7 | 8.77 | 49.2 |
| 8 | 8.49 | 31.0 |

As will be clearly understood from the above table, when the pH value of the reclaiming liquid becomes less than 10, the rate of removal of ammoniacal nitrogen by zeolite after reclamation decreases, and when the reclamation is repeated without adjusting the pH value properly, the pH value of the reclaiming liquid further lowers and the rate of removal of ammoniacal nitrogen by zeolite decreases accordingly.

Example 2

In the same experiment as in Example 1 above, when the operation was repeated by constantly maintaining the pH value of reclaiming liquid at about 11 by adding some quantity of 0.25N—$Na_2CO_3$ solution to the reclaiming liquid from the third reclamation onward, the mean value of the rate of removal of ammoniacal nitrogen in each reclamation was 80.8%. This result of this experiment attests to the fact that it is very important to maintain the pH value of reclaiming liquid at about 11 for the purpose of reclamation of zeolite.

Example 3

When the reclamation operation was repeated 10 times in the same way as in Example 1 except for the employment of an adsorbent prepared by treating waste FCC catalyst in lieu of the natural zeolite, the pH value of the reclaiming liquid decreased from 11.00 to 9.30, and the rate of removal of ammoniacal nitrogen also decreased from 87% to 45%. On the other hand, in an experiment like the one in Example 2 wherein the pH value of reclaiming liquid was maintained within the range of from 10.25 to 11.00, the mean value of removal of ammoniacal nitrogen was 86.5% and showed the same tendency as in the case of natural zeolite.

Example 4

When the same experimental adsorption-reclamation operation as in Example 1 was repeated by the use of a solution prepared to have a pH value of 11±1.0 by mixing 0.5N—$Na_2CO_3$ solution with 0.1N—NaOH solution, the rate of removal of ammoniacal nitrogen by the reclaimed zeolite was as high as 93 to 95% regardless of the frequency of reclamation.

What is claimed is:

1. A process for reclaiming spent zeolite containing ammonium cations, said spent zeolite having been obtained by treating water containing ammonia with zeolite to effect cation exchange, which comprises the step of contacting said spent zeolite with an aqueous solution of sodium carbonate having a pH of 11.0±1.0 to effect removal of said ammonium cations from said spent zeolite and thereby restore the ammonium cation exchanging ability of said zeolite.

2. A process according to claim 1 in which said aqueous solution also contains sodium hydroxide.